(12) United States Patent
Badar et al.

(10) Patent No.: US 11,617,079 B2
(45) Date of Patent: Mar. 28, 2023

(54) LOCAL IMS SELECTION FOR TRUSTED NETWORK OPERATORS

(71) Applicant: T-Mobile USA, Inc., Bellevue, WA (US)

(72) Inventors: Saqib Badar, Bellevue, WA (US); Shujaur Rehman Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 451 days.

(21) Appl. No.: 16/707,686

(22) Filed: Dec. 9, 2019

(65) Prior Publication Data

US 2021/0176634 A1   Jun. 10, 2021

(51) Int. Cl.

| H04M 7/00 | (2006.01) |
|---|---|
| H04M 3/42 | (2006.01) |
| H04W 68/12 | (2009.01) |
| H04W 4/16 | (2009.01) |
| H04L 12/16 | (2006.01) |
| H04L 65/10 | (2022.01) |
| H04L 61/4557 | (2022.01) |
| H04W 8/06 | (2009.01) |
| H04W 12/06 | (2021.01) |
| H04L 65/1016 | (2022.01) |
| H04L 65/1066 | (2022.01) |
| H04W 72/0453 | (2023.01) |
| H04W 8/02 | (2009.01) |
| H04L 65/1023 | (2022.01) |

(52) U.S. Cl.
CPC ......... *H04W 12/06* (2013.01); *H04L 65/1016* (2013.01); *H04L 65/1066* (2013.01); *H04W 8/02* (2013.01); *H04W 72/0453* (2013.01); *H04L 65/1023* (2013.01)

(58) Field of Classification Search
CPC ............. H04L 65/1016; H04L 65/1066; H04L 65/103; H04W 8/06; H04W 8/18; H04W 8/02; H04W 8/12; H04W 8/08
USPC ....................................... 455/552.1; 370/352
See application file for complete search history.

(56) References Cited

U.S. PATENT DOCUMENTS

| 2007/0072605 A1* | 3/2007 | Poczo | H04W 8/18 |
|---|---|---|---|
| | | | 455/461 |
| 2007/0086582 A1* | 4/2007 | Tai | H04M 7/123 |
| | | | 379/265.09 |
| 2018/0324224 A1* | 11/2018 | Merino Vazquez | ........................ |
| | | | H04L 65/1104 |

* cited by examiner

*Primary Examiner* — Khaled M Kassim
*Assistant Examiner* — Jason A Harley
(74) *Attorney, Agent, or Firm* — Lee & Hayes, P.C.

(57) ABSTRACT

A first carrier may support inbound roaming requests for subscribers of a trusted second carrier. For example, the first carrier may receive an inbound roaming request from a UE. The first carrier may determine a second carrier that is a home carrier of the UE is a trusted carrier associated with the first carrier. In response, an IMS procedure associated with the UE may be performed including communicating, by a first CSCF node of the first carrier, with a first HSS of the second carrier, using a same protocol as used by the first CSCF node to communicate with a second HSS of the first carrier and communicating, by the first CSCF node, with a first AS of the second carrier, using a same protocol as used by the first CSCF node to communicate with a second AS of the first carrier.

20 Claims, 5 Drawing Sheets

LOCAL IMS SELECTION FOR TRUSTED NETWORK OPERATORS

BACKGROUND

Modern cellular communication networks often include IP Multimedia Subsystems (IMSs) for delivering IP multimedia services. In many situations, however, users who are attempting to communicate with each other may be supported by different communication providers, so that multimedia calls and communications need to be set up between IMS systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

The described implementations provide devices, systems, and methods that allow local IMS selection to be provided between IP multi-media subsystems (IMSs) of different communication providers or carriers, and particularly between trusted carriers. In certain described embodiments, the devices, systems, and methods disclosed herein relate to providing IMS services for a roaming subscriber of another trusted carrier. In some examples, a trusted partner carrier of a carrier may be another carrier which is merging with the particular communication provider but whose user equipment has not migrated to the subscriber identity module (SIM) of the particular carrier. Local IMS selection may provide a flexibility to integrate two carriers with ease of migration of traffic during integration procedures without adversely impacting the provisioning and/or charging architecture for the carriers. In other examples, two non-merging carriers may agree to a trusted relationship in which they share networks without changing their SIM systems. In still other examples, two networks associated with the same carrier with different SIM systems (e.g. a first network of the carrier in the United States and a second network of the carrier in the Europe which have different SIM systems) may utilize Local IMS selection to reduce complexity and costs associated with subscribers roaming between the networks.

In embodiments described herein, the IMS of a carrier may include one or more call session control functions (CSCFs) that may be responsible for coordinating incoming requests with the IMS cores of trusted partner carriers. In some cases, the one or more call session control functions (CSCFs) may include interfaces with at least one of the home subscriber server (HSS) and an Application Server (AS) (e.g. a Telephony Application Server (TAS)) of the trusted partner carrier. For example, the one or more call session control functions (CSCFs) may include one or more Diameter (e.g. Cx) interfaces with the HSS of the trusted partner carrier and one or more IP multimedia Subsystem Service Control Interfaces (ISC) with the TAS of the trusted partner carrier.

In some cases, the carrier may also include other systems (e.g. control functions) for coordinating incoming requests with the IMS cores of other (e.g. non-trusted) carriers such as breakout gateway control functions (BGCFs), interconnect border control functions (IBCFs), Media Gateway Control Functions (MGCFs). For example, incoming requests for a roaming subscriber of a non-trusted other carrier may be handled via a circuit switched network by one or more of a BGCF, a IBCF, a MGCF and a I-SBC of the carrier and similar systems of the non-trusted other carrier.

Figure 1:
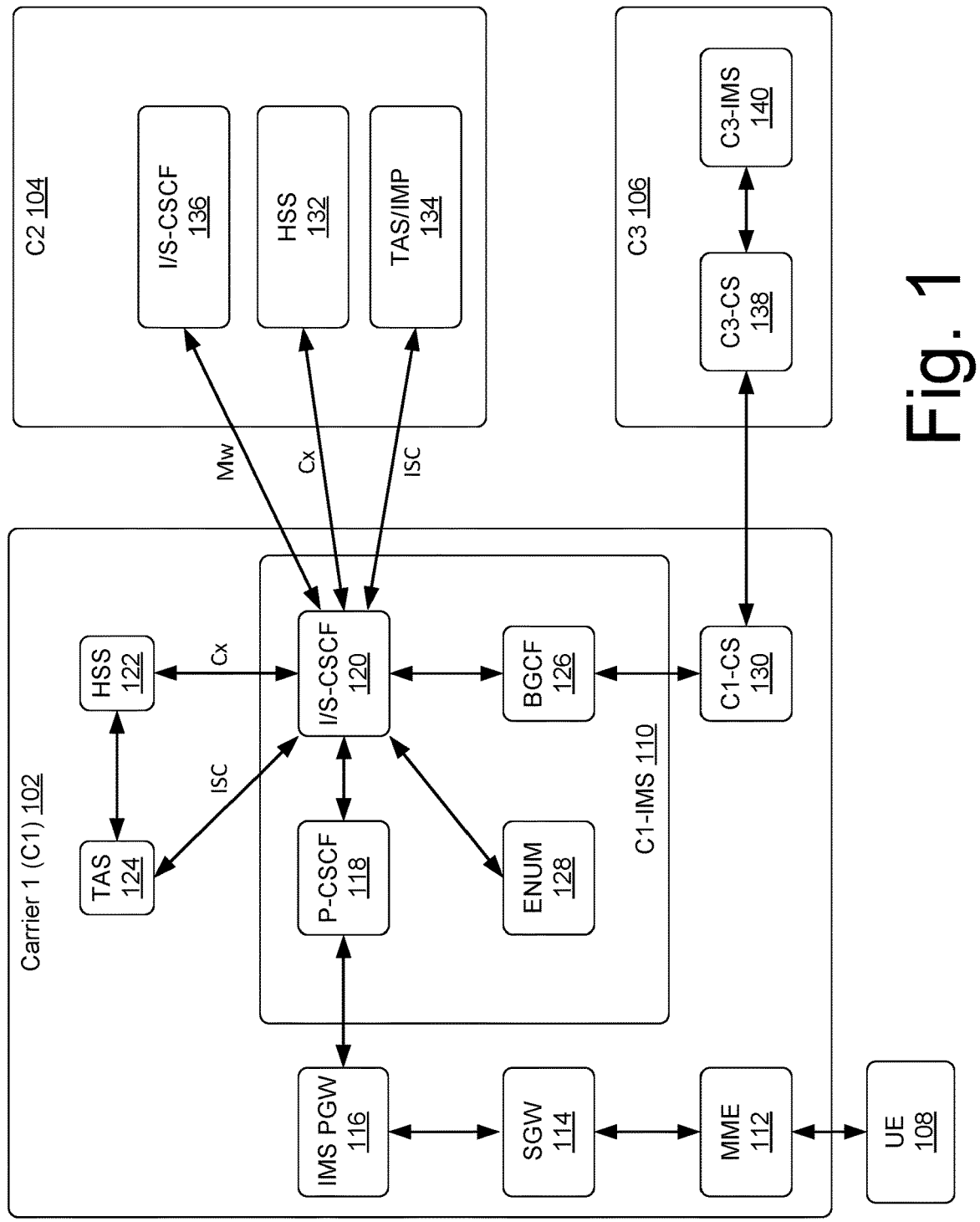
FIG. 1 is a block diagram illustrating a communication system that includes multiple IMS networks operated by different communication providers.

FIG. 1 illustrates an example telecommunication system 100, which may be provided and/or supported by multiple carriers. The system 100 includes a carrier 1 (C1) 102, a trusted partner carrier 2 (C2) 104, and a non-trusted carrier 3 (C3) 106 which interface to provide service to a user equipment (UE) 108. In particular, carriers 102-106 may provide communications between multiple user equipment (UE) devices (referred to simply as UE in the following discussion). Communications may be between UEs of the same carrier (also referred to herein as service provider) and/or may be between UEs supported by different carriers. In this example, the illustrated UE 108 may be a subscriber of carrier 2 104. Further, the illustrated UE 108 may be roaming in a service area of carrier 1 102 while attempting to obtain communication services.

Carrier 1 102 may provide communications services to user equipment supported by other carriers (e.g. roaming subscribers such as UE 108), referred to as partners, which may comprise other cellular providers or service providers. In some implementations, depending on the relationship between the carriers, the IMS 110 of the carrier 1 102 may communicate with a corresponding IMS of the partner through various types of media, control functions and gateways. The IMSs of the partner will be referred to as partner IMSs herein.

The carriers 1-3 102-106 have various components, of which only those most relevant to the current discussion are shown in FIG. 1.

As shown herein, the carrier 1 102 may include a mobility management entity (MME) 112, a signaling gateway (SGW) 114, a IMS Packet Data Network Gateway (PGW) 116, a Proxy-Call Session Control Function (P-CSCF) 118, an I/S-CSCF 120 (e.g. an Interrogating-Call Session Control Function (I-CSCF) and a Serving-Call Session Control Function (S-CSCF)), an HSS 122, a TAS 124, a BGCF 126, an E.164 Number to URI Mapping (ENUM) 128, and a carrier 1 circuit switched network (C1-CS) 130. Carrier 2 104 may include, in pertinent part, a HSS 132, a TAS/IMP 134 and an I/S-CSCF 136. Finally, carrier 3 106 may include, in pertinent part, a carrier 3 circuit switched network (C3-CS) 138 and a carrier 3 IMS (C3-IMS) 140. Depending on the implementation, each circuit switched network may include one or more of an IBCF, a MGCF and an I-SBC.

As mentioned above, the manner in which roaming services are handled by carrier 1 102 may vary based on the relationship between the carriers 102-106. In the case that carrier 1 102 has a trusted relationship with the home carrier of a roaming subscriber (e.g. carrier 2 104), the IMS 110 may include one or more call session control functions (CSCFs) that may be responsible for coordinating incoming requests with the IMS cores the trusted partner IMSs of such trusted partner carriers. On the other hand, incoming requests for the roaming subscribers of non-trusted carriers (e.g. carrier 3 106) may be handled via a circuit switched network by one or more of a BGCF, a IBCF, a MGCF and a I-SBC of carrier 1 102 and similar systems of the non-trusted carrier. Additional details regarding roaming services are provided below. The IMS 110 may communicate with the carriers 104 and 106 over various type of networks, including wired and/or wireless networks, and including private and/or public networks.

The IMS 110 may support various types of communication and media services. In the illustrated example, the IMS 110 includes a telephony access server 124 that provides voice communication services. The IMS may also include or support other functions such as an IP short message gateway (IP-SM-GW), which is a service for communicating short messages, such as short message service (SMS) over IP (SMSIP) messages, between UEs. The IMS 110 also may include or support the Rich Communication Suite (RCS), which is a platform that supports various types of media communications, including one-to-one chat, group chat, file transfer, content sharing, voice calling, video calling, social presence, video calling, geolocation exchange, service identification, notifications, and others. Each of these services may be implemented by one or more corresponding application servers that form part of the IMS 110.

The UE 108 comprises a communication device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, smart watches, fitness trackers, etc.), a networked digital camera, etc. The UE 108 may also comprise a non-mobile computing device. Examples of non-mobile UEs may include such things as televisions, desktop computers, a game consoles, set top boxes, home automation components, security system components, and so forth. In this sense, the terms "communication device," "wireless device," "wireline device," "mobile device," "computing device," and "user equipment (UE)" may be used interchangeably herein to describe any communication device capable of performing the techniques described herein.

Furthermore, the UE 108, as well as the various network provider components described herein, may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology. These are merely examples and the UE 108, as well as the various network provider components described herein, may be capable of communicating via one or more of a 3G, 4G, 4G LTE, and/or 5G protocols.

The UE 108 communicates with the IMS 110 using an access network (not shown), which may comprise a cellular communication network or other type of wired or wireless network. Examples of wireless access networks include LTE, WIFI, GSM EDGE Radio Access Network (GERAN), UMTS Terrestrial Radio Access Network (UTRAN), and other cellular access networks.

The UE 108 may be configured to initiate a communication session, such as a voice call, a video call, or another sort of synchronous or asynchronous communication. Initiation of such communications may involve communication clients and session initiation protocol (SIP) clients to communicate with components of the carrier 1 102.

More particularly, the UE 108 may be configured to initiate communication with the mobility management entity (MME) 112 of the carrier 1 102. The MME 112 may interact with the UE 108 in an attachment process.

In the case of a roaming subscriber of a trusted partner (e.g. UE 108), the MME 112 may direct the roaming traffic of the UE via a signaling gateway (SGW) 114 to a IMS Packet Data Network Gateway (PGW) 116 that is assigned to handle the IMS VoLTE Access Point Name (APN) of the trusted partner (e.g. carrier 2). The IMS PGW 116 can select a P-CSCF 118 within the IMS 110 of carrier 102 to handle the IMS request procedure for the inbound roaming subscriber of the trusted partner (e.g. UE 108) via I/S-CSCF 120. More particularly, the P-CSCF 118 may route the IMS request to one or more I/S-CSCFs that are assigned to handle communications with subscribers of trusted partners. In implementations according to this disclosure, the I/S-CSCF 120 may support multiple carriers or realms (e.g. interface with the HSS and AS of multiple carriers or realms). In addition or alternatively, each I/S-CSCF 120 may have one or more assigned trusted partners and the P-CSCF 118 may route the IMS request to the I/S-CSCF 120 based on the trusted partner.

In the illustrated example, the I/S-CSCF 120 may interface with the HSS 122 and TAS 124 of carrier 1 102 over a diameter Cx interface and a ISC interface, respectively. In addition, the I/S-CSCF 120 may interface with the HSS 132 and TAS/IMP 134 of carrier 2 104 over a diameter Cx interface and a ISC interface, respectively. In turn, the HSS 132 and TAS 134 may whitelist the I/S-CSCF 120 for Cx and ISC interfaces, respectively. In some examples, the I/S-CSCF 120 may further include a Mw interface to the I/S-CSCF 136 of the carrier 2 104. Though not shown for ease of understanding and illustration, in some implementations, the I/S CSCF 120 may include interfaces (e.g. Cx and ISC interfaces) to the HSS and TAS/IMP within the IMSs of multiple trusted partners or trusted carriers in addition to carrier 2 104.

Using the Cx interface with the HSS 132 of carrier 2 104, the I/S-CSCF 120 may interact with the HSS 132 of the trusted partner (e.g. carrier 104) that is the home carrier of the UE 108 for authorization (e.g. to obtain user authentication information associated with the UE 108) and server assignment procedures. For example, the I/S CSCF 120 may download initial Filter Criteria's (iFCs) of the roaming subscriber's AS (e.g. TAS/IMP 134) for IMS services. The I/S-CSCF 120 may then interact with the TAS/IMP 134 of carrier 2 104 using the ISC interface therewith to obtain IMS services from the TAS/IMP 134. In some examples, using the cross realm Cx and ISC interfaces as described herein may allow carriers to reduce complexity between the trusted partners. Further, having the carrier 1 102 serve as call control may provide consolidated call routing with other carriers which may provide cost and resource savings. Moreover, the charging and provisioning logic may reside in the home network of the UE 108 (e.g. C2 104) while the call control functions are handled by the roaming network (e.g. C1 102) without failing to support the features supported in the home network of the UE 108 (e.g. C2 104).

In some implementations, the inbound IMS request may originate from another UE. For example, a second UE on carrier 2 104 or carrier 3 106 may originate the IMS request. For example, the I/S CSCF 136 may forward a request relating to a call between the UE 108 and a second UE on the carrier 2 104 to the I/S-CSCF 120. In response and in a similar manner to that discussed above, the I/S-CSCF 120 may use the Cx and ISC interfaces with the HSS 132 and TAS/IMP 134 of carrier 2 104 to establish call control and other functions for the call.

In the case of a roaming subscriber of a non-trusted carrier, the MME 112 may direct the roaming traffic of the UE via a signaling gateway (SGW) to a IMS Packet Data Network Gateway (PGW) that is assigned to handle communication with IMS VoLTE Access Point Name (APN) of non-trusted carrier (e.g. carrier 2).

More particularly, incoming requests for the roaming subscribers of non-trusted carriers (e.g. carrier 3 106) may be handled via the circuit switched network C1-CS 130 by the BGCF 126 and ENUM 128 in conjunction with similar systems of the non-trusted carrier (e.g. the circuit switched network C3-CS 138 and C3-IMS 140 of carrier 3 106). More particularly, the I/S-CSCF 120 may call the ENUM 128 to determine the domain or host name of a home carrier (e.g. C3 106) of the roaming subscriber UE. The IMS requests may then be handled by the BGCF 126 via the C1-CS 130 in conjunction the C3-CS 138 and C3-IMS 140 of carrier 3 106.

Figure 2:
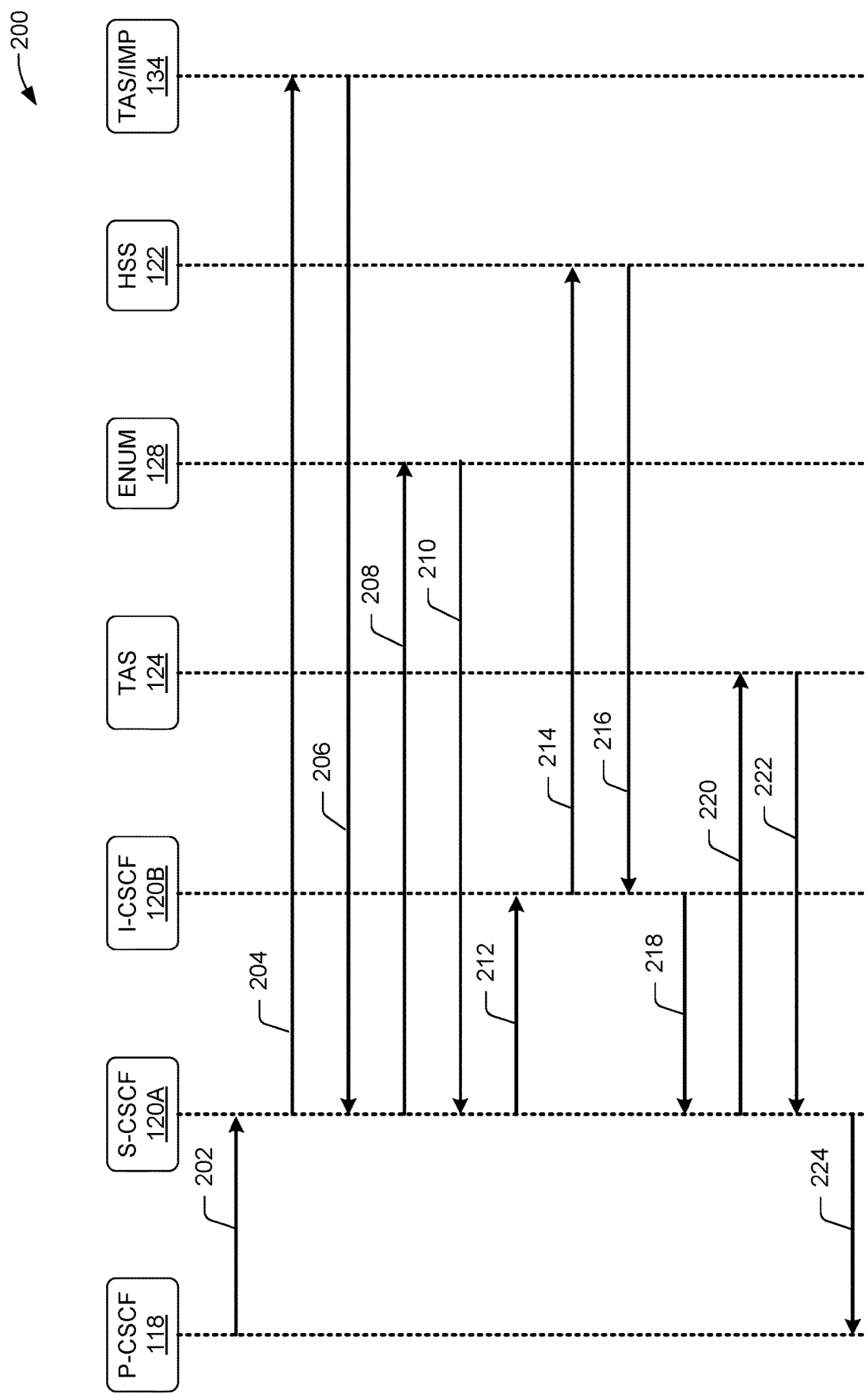
FIG. 2 is a flow diagram illustrating an example method of processing an IMS roaming request in the example system of FIG. 1.

FIG. 2 illustrates an example method 200 of processing an IMS request in the example system of FIG. 1, according to some implementations. In the illustrated example, the data flow relates to the IMS request of a roaming subscriber (e.g. UE 108) whose home carrier (e.g. C2 104) has a trusted relationship with the visited carrier (e.g. C1 102). More particularly, the illustrated example of FIG. 2 includes the UE 108 calling a subscriber of C1 102. To illustrate the separate operations of the S-CSCF and I-CSCF of I/S-CSCF 120, the S-CSCF is labeled as S-CSCF 120A and the I-CSCF is labeled as I-CSCF 120B.

Prior to the data flow shown in FIG. 2, the UE 108 may register in the roaming network (e.g. carrier 1 102), during which the HSS 132 of carrier 2 104 may be involved. For example, the I-CSCF 120B may download the authentication vectors for authorization of the UE 108. The S-CSCF 120A may then download the iFCs from the HSS 132 of the carrier 2 104 and may implement actions based on the iFCs (i.e. to reach out to ASs like TAS/IMP 134 for third party registration). Immediately prior to the data flow of FIG. 2, the P-CSCF 118 may receive a MO INVITE from the UE 108.

At 202, the P-CSCF 118 may forward a received MO INVITE to the S-CSCF 120A. At 204, the S-CSCF 120A may send the INVITE to the TAS/IMP 134 of the second carrier (e.g. C2 104, the home carrier of the UE 108) for originating voice services.

The TAS/IMP 134 may handle originating the services. The TAS/IMP 134 may then send the INVITE back to the S-CSCF 120A at 206.

At 208, the S-CSCF 120A may perform an ENUM inquiry on the called number with the ENUM 128. The ENUM may respond with the domain of the carrier of the called party. In the illustrated example, in the ENUM response at 210, the S-CSCF 120A may receive the domain of carrier 1 102 (e.g. because the called party is a subscriber of carrier 1 in this example).

At 212, based on ENUM response, the S-CSCF 120A may send the INVITE towards the I-CSCF 120B for handling the call termination using the domain of carrier 1 102.

More particularly, at 214, the I-CSCF 120B may select the HSS 122 of the carrier 1 102 based on the returned domain of the terminating user. The I-CSCF 120B may then perform a Cx interface procedure with the HSS 122 of the carrier 1 102 network to determine the S-CSCF to use for the call termination. In this case, the HSS 122 may determine the S-CSCF 120A to be the S-CSCF to handle call termination and interaction with the TAS 124. The HSS 122 may include this information in a response at 216. Based on the HSS 122 response, the I-CSCF 120B may return the INVITE to the S-CSCF 120A at 218.

At 220, the S-CSCF 120A may send the INVITE to the serving terminating TAS (e.g. TAS 124) for terminating voice services. The TAS 124 may process the INVITE for call termination for the called party and then send the INVITE back to S-CSCF 120A at 222.

Finally, at 224, the S-CSCF 120A may send the INVITE to the terminating P-CSCF of carrier 1 102 (e.g. P-CSCF 118) for relaying to the called party UE.

Although FIG. 2 has been discussed in the context of an incoming IMS request being received from within the carrier 1 102 and/or from a UE 108 that is associated with and supported by carrier 2 104, the same or similar actions may be performed with respect to an inbound roaming request that is received from a partner carrier 104.

Note also that while the techniques described above are described as being implemented by particular CSCFs, the described techniques may alternatively be implemented by any one or more other components of the carrier 1 102 as may be appropriate depending on the particular implementation.

Figure 3:
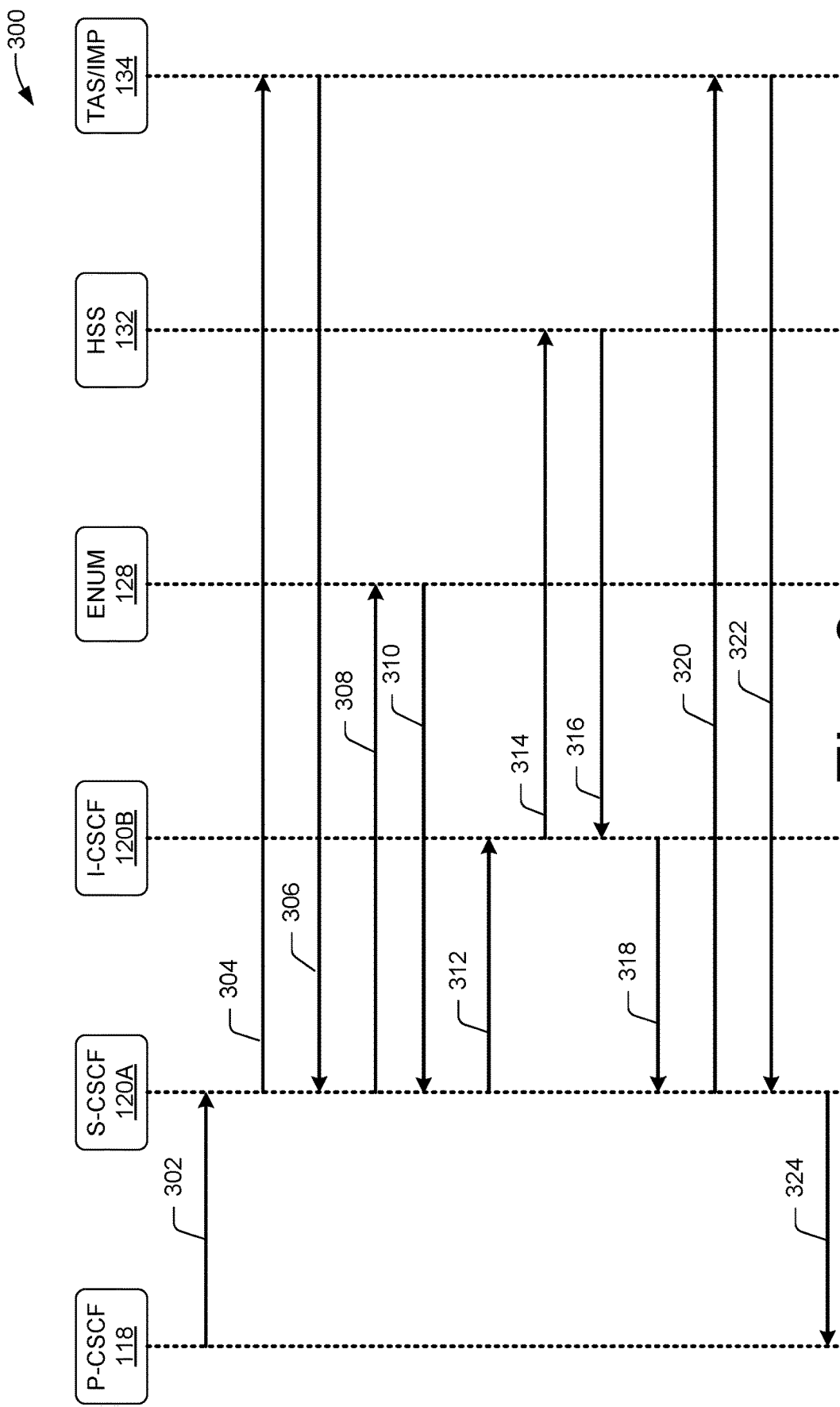
FIG. 3 is a flow diagram illustrating an example method of processing an IMS roaming request in the example system of FIG. 1.

FIG. 3 illustrates an example method 300 of processing a IMS request in the example system of FIG. 1, according to some implementations. In the illustrated example, the data flow relates to the IMS request of a roaming subscriber (e.g. UE 108) whose home carrier (e.g. C2 104) has a trusted relationship with the visited carrier (e.g. C1 102). More particularly, the illustrated example of FIG. 3 includes the UE 108 calling another subscriber of C2 104 that is also roaming on the C1 102 network. As with FIG. 2, to illustrate the separate operations of the S-CSCF and I-CSCF of I/S-CSCF 120, the S-CSCF is labeled as S-CSCF 120A and the I-CSCF is labeled as I-CSCF 120B. Prior to the data flow shown in FIG. 3, the P-CSCF 118 receives a MO INVITE from the UE 108.

At 302, the P-CSCF 118 may forward a received MO INVITE to the S-CSCF 120A. At 304, the S-CSCF 120A may send the INVITE to the TAS/IMP 134 of the second carrier (e.g. C2 104, the home carrier of the UE 108) for originating voice services.

The TAS/IMP 134 may handle originating the services. The TAS/IMP 134 may then send the INVITE back to S-CSCF 120A at 306.

At 308, the S-CSCF 120A may perform an ENUM inquiry on the called number with the ENUM 128. In the ENUM response at 310, the S-CSCF 120A may receive the domain of carrier 2 104 (e.g. because the called party is a subscriber of carrier 2 104 in this example).

At 312, based on ENUM response, the S-CSCF 120A may send the INVITE towards the I-CSCF 120B for handling the call termination using the domain of carrier 2 104.

More particularly, at 314, the I-CSCF 120B may perform a Cx interface procedure with the HSS 132 of the carrier 2 104 network to determine the S-CSCF to use for the call termination. In this case, the HSS 132 may determine the S-CSCF 120A to be the S-CSCF to handle call termination and interaction with the TAS 134. The HSS 132 may include this information in a response at 316. Based on the HSS 132 response, the I-CSCF 120B may return the INVITE to the S-CSCF 120A at 318.

At 320, the S-CSCF 120A may send the INVITE to the terminating TAS (e.g. TAS 134 of C2 104) for terminating voice services. The TAS 134 may process the INVITE for call termination for the called party and then send the INVITE back to S-CSCF 120A at 322.

Finally, at 324, the S-CSCF 120A may send the INVITE to the terminating P-CSCF of carrier 1 102 (e.g. P-CSCF 118) for relaying to the called party UE.

Figure 4:
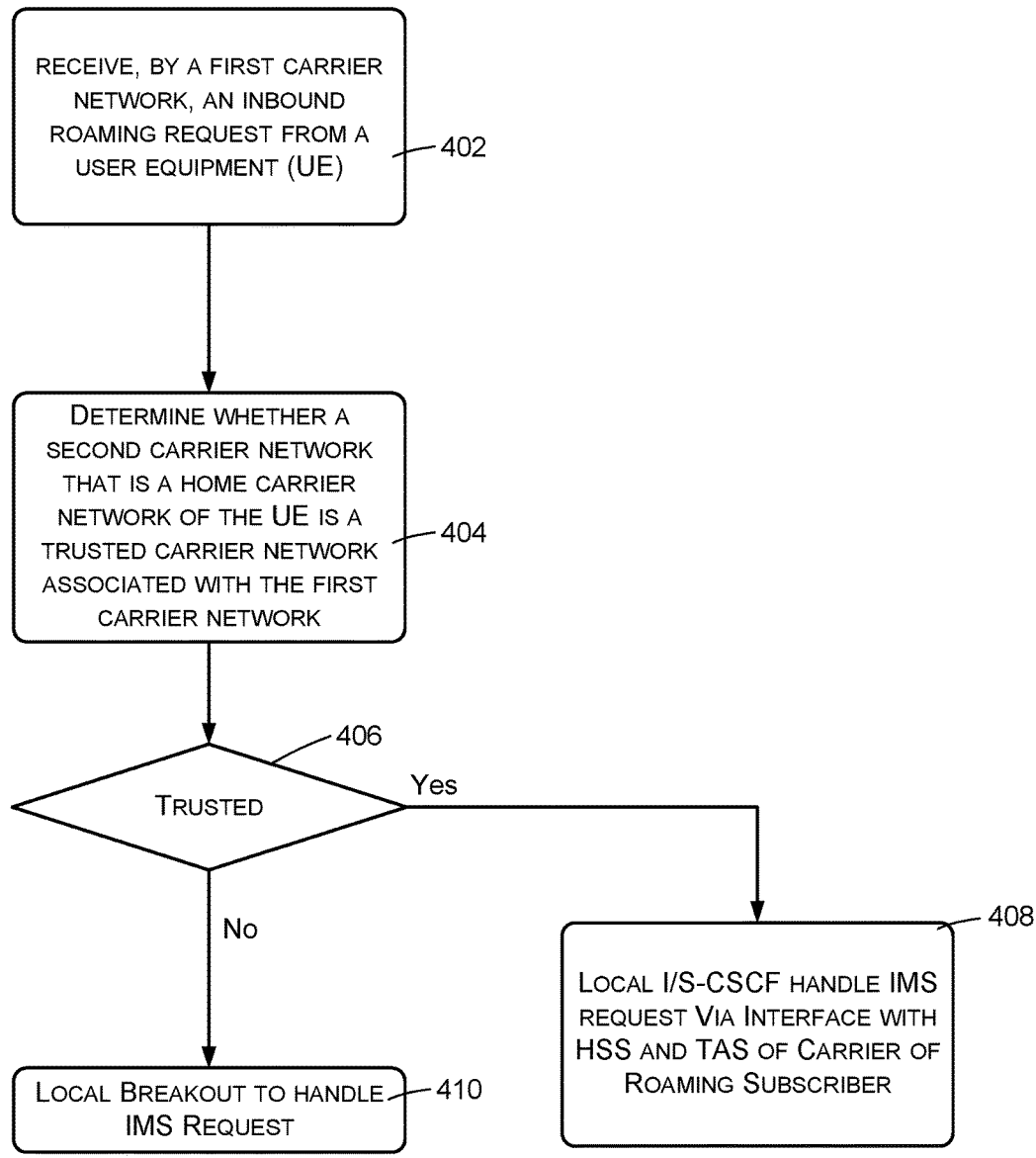
FIG. 4 is a flow diagram illustrating an example method of handing inbound roaming requests.

FIG. 4 illustrates an example method 400 of processing an inbound roaming request, according to some implementations.

At 402, a first carrier network receives an inbound roaming request from a user equipment (UE). The first carrier network then determines whether a second carrier network that is a home carrier network of the UE is a trusted carrier network associated with the first carrier network at 404. In a non-limiting example, a carrier network may be a trusted carrier network associated with the first carrier network when the two networks are integrating with each other on the roadmap to become single network. If so (e.g. trusted), at 406, the first carrier network opts to use local IMS selection and provides the inbound roaming request to a first CSCF node of the first carrier network and the process continues to 408. Otherwise (e.g. not trusted), at 406, the first carrier network may opt to use another procedure for the inbound roaming request and the process continues to 410.

At 408, the first CSCF node may handle the inbound roaming request. For example, a local I/S-CSCF may handle the inbound roaming request via an interface with the HSS and the TAS of the second carrier network. More particularly, the first CSCF node may perform an IMS request procedure associated with the UE at least by communicating with a first Home Subscriber Server (HSS) of the second carrier network, using a same protocol as used by the first CSCF node to communicate with a second HSS of the first carrier network and by communicating with a first Application Server (AS) of the second carrier network, using a same protocol as used by the first CSCF node to communicate with a second AS of the first carrier network.

Returning to 410 (e.g. when the second carrier network was determined to not be a trusted carrier), the first carrier network may handle the inbound roaming request using another procedure, such as local breakout via a BGCF and a circuit switched network of the first carrier network and similar systems of the second carrier network.

Figure 5:
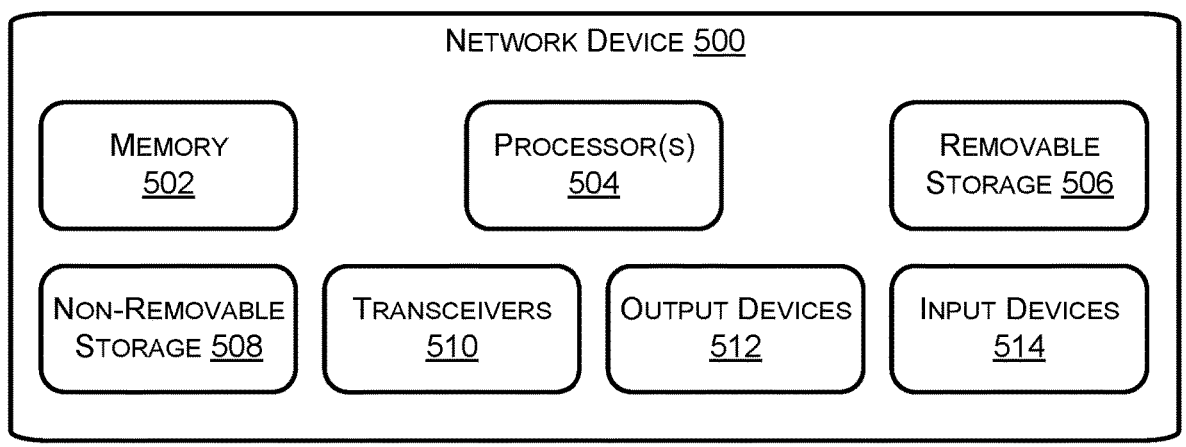
FIG. 5 is a block diagram illustrating relevant high-level components of a device that may be used to implement various of the components described herein.

FIG. 5 illustrates a component level view of a telecommunication network device 500 capable of implementing the I/S-CSCFs 120 and other network devices of FIG. 1. The network device 500 may, as an example, comprise a physical or virtual computer server. The network device 500 may comprise a system memory 502 storing various executable components and data for implementing the systems and methods 100-400 of FIGS. 1-4. The network device 500 may further comprise processor(s) 504, a removable storage 506, a non-removable storage 508, transceivers 510, output device(s) 512, and input device(s) 514, any or all of which can be communicatively connected via a communications bus (not shown).

In various examples, the system memory 502 is volatile (such as RAM), non-volatile (such as ROM, flash memory, etc.) or some combination of the two. In some examples, the processor(s) 504 is a central processing unit (CPU), a graphics processing unit (GPU), or both CPU and GPU, or any other sort of processing unit.

The network device 500 also includes additional data storage devices (removable and/or non-removable) such as, for example, magnetic disks, optical disks, or tape. Such additional storage is illustrated in FIG. 5 by removable storage 506 and non-removable storage 508. The system memory 502, removable storage 506 and non-removable storage 508 are all examples of non-transitory computer-readable storage media.

In some examples, the transceivers 510 include any sort of transceivers known in the art. For example, transceivers 510 may include a radio transceiver that performs the function of transmitting and receiving radio frequency communications. Also, or instead, the transceivers 510 may include other wireless or wired connectors, such as Ethernet connectors or near-field antennas. The transceivers 510 may facilitate connectivity between a public network, such as a packet-switched access network (not shown), and one or more other devices of a telecommunication network.

In some examples, the output devices 512 include any sort of output devices known in the art, such as a display, speakers, a vibrating mechanism, or a tactile feedback mechanism. Output devices 512 also include ports for one or more peripheral devices, such as headphones, peripheral speakers, or a peripheral display.

In various examples, the input devices 514 include any sort of input devices known in the art. For example, the input devices 514 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   receiving, by a first carrier, an inbound roaming request from a user equipment (UE);
   in response to receiving the inbound roaming request, determining, by the first carrier, whether a second carrier that is a home carrier of the UE is a trusted carrier associated with the first carrier;
   in response to determining that the second carrier is the trusted carrier, performing an IP Multimedia Subsystem (IMS) procedure associated with the UE at least by:
      communicating, by a first call session control function (CSCF) node of the first carrier, with a first Home Subscriber Server (HSS) of the second carrier, using a same first protocol as used by the first CSCF node to communicate with a second HSS of the first carrier, and communicating, by the first CSCF node, with a first Application Server (AS) of the second carrier, using a same second protocol as used by the first CSCF node to communicate with a second AS of the first carrier; and in response to determining that the second carrier is not the trusted carrier:

determining a domain name of the second carrier by communicating, by the first CSCF node, with an E.164 Number to URI Mapping (ENUM) of the first carrier, directing, by a breakout gateway control function (BGCF) of the first carrier, the inbound roaming request to a circuit switch (CS) network of the first carrier, and communicating, by the CS of the first carrier, with a CS network of the second carrier and an IMS of the second carrier.

2. The method of claim 1, wherein the communicating, by the first CSCF node, with the first HSS of the second carrier includes obtaining user authentication information associated with the UE.

3. The method of claim 2, wherein the communicating, by the first CSCF node, with the first HSS of the second carrier is performed over a Diameter (Cx) interface between first CSCF node, with the first HSS.

4. The method of claim 1, wherein the communicating, by the first CSCF node, with the first HSS of the second carrier includes obtaining an Initial Filter Criteria (iFC).

5. The method of claim 4, wherein the communicating, by the first CSCF node, with the first AS of the second carrier is performed over a IMS Service Control (ISC) interface between the first CSCF node, with the first AS using the iFC.

6. The method of claim 1, wherein the communicating, by the first CSCF node, with the first HSS of the second carrier and the first AS of the second carrier bypasses one or more CSCF nodes of the second carrier.

7. The method of claim 1, wherein the first CSCF node includes an Interrogating-Call Session Control Function (I-CSCF) and a Serving-Call Session Control Function (S-CSCF) of the first carrier.

8. A system comprising:
one or more computing devices of a first carrier configured to perform actions comprising:
receiving, by the first carrier, an inbound roaming request from a user equipment (UE);
in response to receiving the inbound roaming request, determining, by the first carrier, whether a second carrier that is a home carrier of the UE is a trusted carrier associated with the first carrier;
in response to determining that the second carrier is the trusted carrier, performing an IP Multimedia Subsystem (IMS) procedure associated with the UE at least by:
communicating, by a first call session control function (CSCF) node of the first carrier, with a first Home Subscriber Server (HSS) of the second carrier, using a same first protocol as used by the first CSCF node to communicate with a second HSS of the first carrier; and
in response to determining that the second carrier is not the trusted carrier:
determining a domain name of the second carrier by communicating, by the first CSCF node, with an E.164 Number to URI Mapping (ENUM) of the first carrier, directing, by a breakout gateway control function (BGCF) of the first carrier, the inbound roaming request to a circuit switch (CS) network of the first carrier, and communicating, by the CS of the first carrier, with a CS network of the second carrier and an IMS of the second carrier.

9. The system of claim 8, wherein the communicating, by the first CSCF node, with the HSS of the second carrier includes obtaining user authentication information associated with the UE.

10. The system of claim 9, wherein the communicating, by the first CSCF node, with the first HSS of the second carrier is performed over a Diameter (Cx) interface between the first CSCF node, with the first HSS.

11. The system of claim 8, wherein the communicating, by the first CSCF node, with the first HSS of the second carrier includes obtaining an Initial Filter Criteria (iFC).

12. The system of claim 11, the actions further comprising:
communicating, by the first CSCF node, with a first Application Server (AS) of the second carrier, using a same second protocol as used by the first CSCF node to communicate with a second AS of the first carrier, wherein the communicating, by the first CSCF node, with the first AS of the second carrier is performed over a IMS Service Control (ISC) interface between the first CSCF node, with the first AS using the iFC.

13. The system of claim 8, the actions further comprising:
communicating, by the first CSCF node, with a first AS of the second carrier, using a same second protocol as used by the first CSCF node to communicate with a second AS of the first carrier, wherein the communicating, by the first CSCF node, with the first HSS of the second carrier and the first AS of the second carrier bypasses one or more CSCF nodes of the second carrier.

14. The system of claim 8, wherein the first CSCF node includes an Interrogating-Call Session Control Function (I-CSCF) and a Serving-Call Session Control Function (S-CSCF) of the first carrier.

15. A non-transitory computer-readable media storing computer-executable instructions, which when executed by one or more processors, cause the one or more processors to perform actions comprising:
receiving, by a first carrier network, an inbound roaming request associated with a user equipment (UE);
in response to receiving the inbound roaming request, determining, by the first carrier, whether second carrier network that is a home carrier network of the UE is a trusted carrier network associated with the first carrier network;
in response to the determining that the second carrier network is the trusted carrier network, performing a procedure associated with the UE at least by:
communicating, by a first call session control function (CSCF) node of the first carrier network, with a first Application Server (AS) of the second carrier network, using an interface with a same first protocol as used by the first CSCF node to communicate with a second AS of the first carrier network; and
in response to determining that the second carrier is not the trusted carrier:
determining a domain name of the second carrier by communicating, by the first CSCF node, with an E.164 Number to URI Mapping (ENUM) of the first carrier, directing, by a breakout gateway control function (BGCF) of the first carrier, the inbound roaming request to a circuit switch (CS) network of the first carrier, and communicating, by the CS of the first carrier, with a CS network of the second carrier and an IMS of the second carrier.

16. The non-transitory computer-readable media of claim 15, the performing the procedure associated with the UE further performed by:

communicating, by the first CSCF, with a first Home Subscriber Server (HSS) of the second carrier network, using a same second protocol as used by the first CSCF node to communicate with a second HSS of the first carrier network, wherein the communicating, by the first CSCF node, with the first HSS of the second carrier network includes obtaining user authentication of the UE over a Diameter (Cx) interface between the first CSCF node, with the first HSS.

17. The non-transitory computer-readable media of claim 15, the performing the procedure associated with the UE further performed by:

communicating, by the first CSCF, with a first HSS of the second carrier network, using a same second protocol as used by the first CSCF node to communicate with a second HSS of the first carrier network, wherein the communicating, by the first CSCF node, with the first HSS of the second carrier network includes obtaining an Initial Filter Criteria (iFC).

18. The non-transitory computer-readable media of claim 17, wherein the communicating, by the first CSCF node, with the first AS of the second carrier network is performed over a IMS Service Control (ISC) interface between the first CSCF node, with the first AS using the iFC.

19. The non-transitory computer-readable media of claim 15, the performing the procedure associated with the UE further performed by:

communicating, by the first CSCF, with a first HSS of the second carrier network, using a same second protocol as used by the first CSCF node to communicate with a second HSS of the first carrier network, wherein the communicating, by the first CSCF node, with the first HSS of the second carrier network and the first AS of the second carrier network bypasses one or more CSCF nodes of the second carrier network.

20. The non-transitory computer-readable media of claim 15, wherein the first CSCF node includes an Interrogating-Call Session Control Function (I-CSCF) and a Serving-Call Session Control Function (S-CSCF) of the first carrier network.

* * * * *